United States Patent [19]

Johnson

[11] Patent Number: 5,404,669
[45] Date of Patent: Apr. 11, 1995

[54] SLIP BOBBER

[76] Inventor: Bruce N. Johnson, 8951 Goodrich Rd., #310, Bloomington, Minn. 55437

[21] Appl. No.: 264,895

[22] Filed: Jun. 24, 1994

[51] Int. Cl.$^6$ ............................................. A01K 93/00
[52] U.S. Cl. ................................. 43/44.91; 43/44.88; 43/44.93
[58] Field of Search ................ 43/44.91, 44.87, 44.88, 43/44.92, 44.93, 43.11

[56] References Cited

U.S. PATENT DOCUMENTS

| 3,381,407 | 5/1968 | McDougall | 43/44.91 |
| 3,443,336 | 5/1969 | Reese | 43/44.91 |
| 3,786,595 | 1/1974 | Croce | 43/44.87 |
| 4,757,635 | 7/1988 | Cole | 43/44.91 |
| 5,327,672 | 7/1994 | Johnson | 43/44.91 |

Primary Examiner—P. Austin Bradley
Assistant Examiner—James Miner
Attorney, Agent, or Firm—Herman H. Bains

[57] ABSTRACT

A slip bobber includes a float assembly having a fishing line guide and locking mounted thereon for movement between locked and unlocked positions. The float assembly includes a pair of elongate buoyant float members interconnected by a support element having a opening therethrough. The fishing line guide and locking assembly includes a mounting member journaled on the support element and having elongate guide elements projecting into an opening therethrough. The fishing line extends through the guide elements, mounting member and support element and is freely moveable through these components when the guide and locking assembly is in a horizontal unlocked position in the water. The fishing line is locked to the support element and the guide and locking assembly when the latter is in a vertical position in the water.

10 Claims, 1 Drawing Sheet

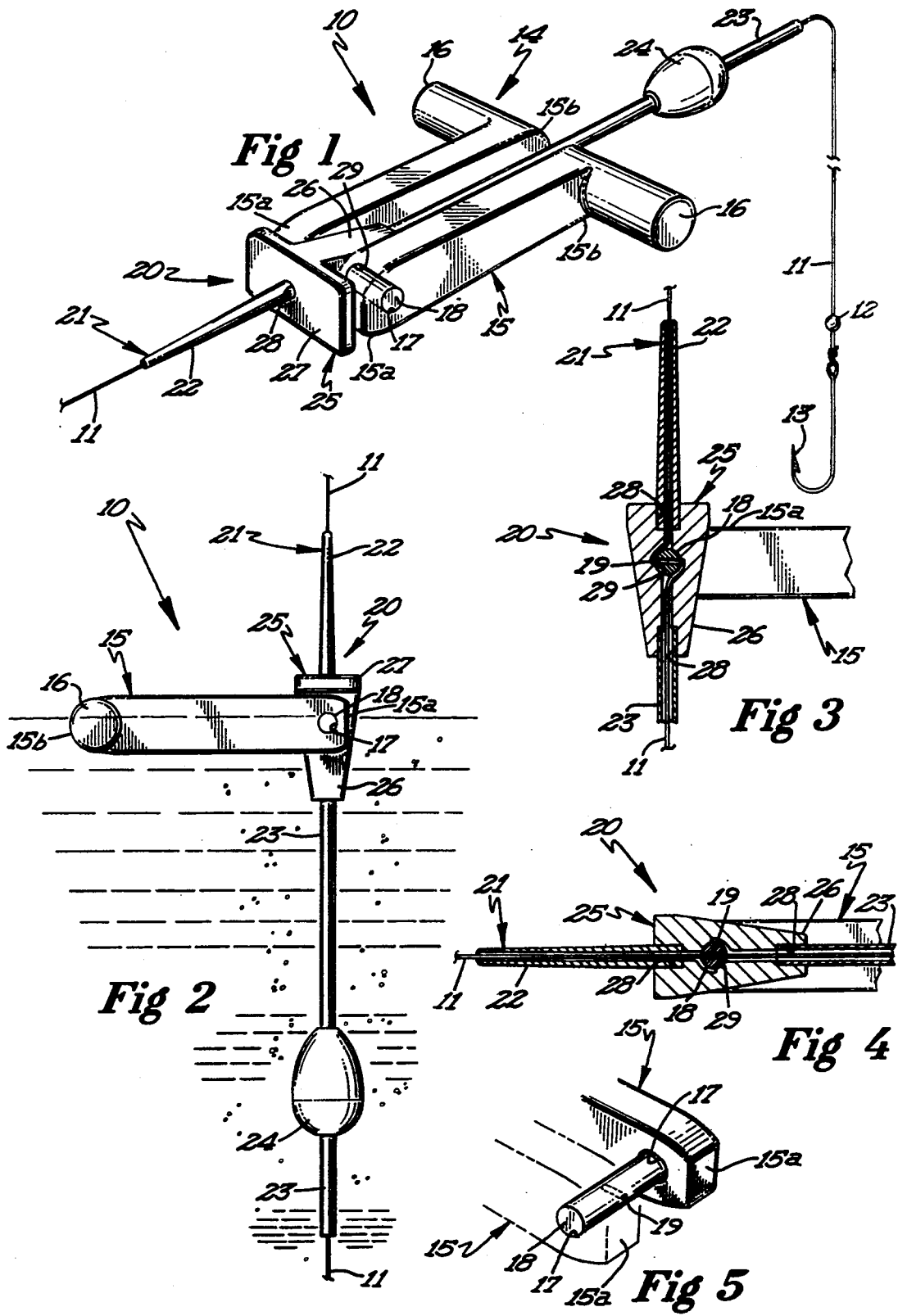

5,404,669

SLIP BOBBER

FIELD OF THE INVENTION

This invention relates to fishing bobbers and more particularly to a slip type fishing bobber.

PRIOR ART PROBLEMS

One of the problems associated with most fishing bobbers now on the market is the inability of these bobbers to permit adjustment of the fishing depth without first retrieving the line for resetting the bobber on the line. Commercially available bobbers must be manually manipulated along the fishing line in order to adjust or readjust the fishing depth. It would be desirable to have a bobber which permits adjustment of the fishing depth without manual manipulation of the bobber along the fishing line.

Further, one fishing technique practiced by certain fishermen is to fish at a selected depth above the bottom but thereafter allow the bait or lure to slowly descend to the bottom. This technique cannot be followed with conventional bobbers. In my co-pending application Ser. No. 08/155,388, filed Nov. 11, 1993, I have disclosed a slip bobber which as special utility for ice fishing. The slip bobber disclosed in my co-pending application will release from a locked position in response to a vertical pull thereby permitting the bobber to be used with a conventional rod and reel.

SUMMARY OF THE INVENTION

It is an object of this invention to provide a novel slip bobber which may be readily shifted between locked and unlocked conditions relative to the line by simple rod movements. With this arrangement, the fishing depth may be adjusted or readjusted at will by the fishermen.

The slip bobber includes a float assembly and a fishing line guide and lock assembly. The float assembly includes a pair of elongate L-shaped floats which are interconnected by an apertured support element. The fishing line guide and lock assembly includes elongate tubular guide means through which the fishing line extends. A bouyant counterbalance float is adjustably mounted on the distal end portion of the guide means. The elongate guide means projects through a mounting member which is journaled on the support element of the float assembly to permit pivoting movement of the fishing line guide and lock assembly between locked and unlocked positions.

When the fishing line guide and lock assembly is in the unlocked position, the fishing line guide and lock assembly is disposed horizontally upon the surface of the water and allows the fishing line to pass freely through the guide means until the fishing line engages the bottom of the body of water. When the fishing line guide and lock assembly is in the locked position, the guide means will be vertically disposed in the water and cooperates with the support element of the float assembly to lock the fishing line against further movement. By a simple manipulation of the rod, a fishermen may release or lock the fishing bobber to the line thereby allowing fishermen to readily adjust the fishing depth.

BRIEF DESCRIPTION OF THE FIGURES OF THE DRAWINGS

FIG. 1 is a perspective view of the novel bobber illustrated in the unlocked position;

FIG. 2 is a side elevational view of the novel slip bobber and illustrating the slip bobber in the locked position;

FIG. 3 is a fragmentary cross-sectional view of a portion of the fishing line guide and lock assembly in the locked position and illustrating details of construction thereof;

FIG. 4 is a fragmentary cross-sectional view of a portion of the fishing line and lock assembly similar to FIG. 3 but illustrating the manner in which the fishing line interlocks with the guide means and support element when the slip bobber is in the locked condition and;

FIG. 5 is a fragmentary perspective view of certain components of the float assembly.

DESCRIPTION OF THE PREFERRED EMBODIMENT

Referring now to the drawings and more specifically to FIG. 1, it will be seen that one embodiment of the novel slip bobber, designated generally by the reference numeral 10, is thereshown. The slip bobber 10 is illustrated with a conventional fishing line 11 having a weight 12 secured to the end portion thereof and having a hook 13 secured to the end. It is pointed out that various types of lures may also be used in conjunction with the slip bobber. Any conventional commercial type fishing line may be used although it is preferred that a six pound test monofilament line be used.

The slip bobber 10 includes a float assembly 14 comprised of a pair of elongate, spaced-apart, substantially parallel float members 15 each having a foot element 16 integrally formed therewith and projecting outwardly therefrom. In this regard, each float element has a proximal end 15a and a distal end 15b. These float members 15 are preferably formed of expandable polystyrene. It will be noted that the foot element for each float member 15 projects outwardly adjacent the distal end thereof and the proximal end portion of each float member has transverse opening 17 therein.

The float members 15, 16 are interconnected adjacent their proximal ends by means of an elongate cylindrical support element 18 which is formed of polyvinyl chloride (PVC) or similar thermoplastic rubber having a hardness of 85 to 95 durometers. The support element 18 projects into and is cemented, glued or otherwise affixed in the opening 17 in the float members 15. The support element 18 has a transverse opening 19 therethrough intermediate the ends thereof as best seen in FIG. 5. The opening 19 is maintained in a horizontal position when the fishing bobber is in the water since the float assembly will be maintained in a horizontal position as illustrated in FIG. 1. The foot elements 16 serve as outriggers stabilizing the float members against longitudinal rotation.

The slip bobber 10 also includes a fishing line guide and lock assembly 20 which is comprised of elongate tubular fishing line guide means 21 through which the fishing line 11 extends. In the embodiment shown, the fishing line guide means 21 comprises an elongate tubular proximal guide element 22 and an elongate tubular distal element 23. These guide elements are preferably made of fluorescent butyrate thermoplastic. In the commercial embodiment the guide elements are of fluorescent orange color although other colors may also be used. The distal guide element 23 has a bouyant counterbalance float 24 mounted thereon and adjustable longitudinally therealong. The counterbalance float 24 is also preferably formed of steam baked virgin polysterene.

The proximal and distal guide elements are secured to mounting means 25 which comprises an elongate mounting member 26 having suitable stop ears 27 integrally formed with one end thereof and projecting outwardly therefrom. The mounting member 26 and associated stop ears 27 are also formed of a suitable bouyant plastic material, preferably polyethylene or similar bouyant thermoplastic material. The mounting member 26 has a longitudinal opening 28 therethrough and a transverse opening 29 therethrough intermediate the ends thereof. It will be noted that the longitudinal and transverse openings in the mounting member 26 are disposed in intersecting relationship.

The proximal and distal guide elements 22, 23 project into the longitudinal opening in the mounting member, and the support element 18 projects through the transverse opening 29 in the mounting member. The fishing line guide and lock assembly 20 is therefore journaled on the support element 18 for pivoting movement of the fishing line guide and lock assembly between an unlocked position, as illustrated in FIG. 1, and a locked position, as illustrated in FIG. 2. When the fishing line guide and lock assembly 20 is in the locked position, the longitudinal fishing guide elements are disposed in substantially right angular relation with respect to the float members 15 and the stop ears 27 engage the upper surface of the float members thereby preventing further movement of the fishing line guide and lock assembly.

When the slip bobber 10 is in the unlocked position 10, as illustrated in FIG. 1., the fishing line guide and lock assembly will be disposed in a horizontal position and the fishing line guide elements will be disposed in registering (aligned) relation with the transverse opening 19 of the support element 18. The fishing line 11 may then freely pass through the guide elements 22, 23, the mounting member 26, and the support element 18. The combined weight of the sinker or weight 12, the hook 13 and bait or lure is sufficient to cause the line to move downwardly by action of gravity until the line reaches the bottom. The position of the counterbalance float 24 with respect to the distal guide element 23 affects the amount of weight the fishing line guide and lock assembly will sustain while remaining a horizontal position. The size of the counterbalance float 24 and its location along its distal guide element permits the fishing line guide and lock assembly to barely float as the line is paid out by the fishermen, for example, when the fishing line is rigged with a ⅜ oz lure attached. Different counter balance floats will be used, respectively, with ¼ oz lures or ⅛ oz lures.

During use of the novel slip bobber, the user will cast the bobber along with the bait or lure and the bobber will assume the position illustrated in FIG. 1 wherein the fishing line guide and lock assembly 20 is in the horizontal unlocked position. The fishermen may then feed the line through the fishing line guide means until the line goes slack. When this occurs, the bait or lure is on the bottom. Thereafter, the user will reel the bait or lure upwardly to the desired level above the bottom (at least 3 or 4 turns on the reel) and hold the rod tip still. The fishing line guide and lock assembly 20 will pivot from the horizontal position to the vertical position, as illustrated in FIG. 2., to automatically lock the line at the desired depth.

When the slip bobber is in the locked position, as illustrated in FIG. 2 and FIG. 3, pivoting movement of the mounting member from the unlocked position to the locked position will move that portion of the fishing line passing through the mounting member and the connecting member to the position illustrated in FIG. 3. When the guide elements 22, 23, mounting member 26 and support element 18 are in the position as illustrated in FIG. 3, the line will be locked against movement by the coaction of the mounting member relative to the connecting element. The fishing line will be locked at this particular depth until the slip bobber is again shifted to the release position as illustrated in FIG. 1.

To unlock or release the slip bobber from the locked position, as illustrated in FIG. 2 and FIG. 3, the user will allow the line to go slack and gently move the rod tip sideways about 30° until the fishing line guide and lock assembly 20 tips or pivots over into the unlocked position as illustrated in FIG. 1 and FIG. 4. The fishing line is immediately allowed to go slack and the line will move through the fishing line guide and lock assembly 20 until the bait or lure engages the bottom. With this arrangement, the user may readily adjust and readjust the fishing depth by simple rod movements.

As pointed out above, the size of the counterbalance float 24 is related to the weight of the attached lure. The slip bobber is provided with a counterbalance float for use with a ⅜ ounce lure. It is contemplated that the slip bobber will be sold as a kit and will include a color coded counterbalance float for a ¼ ounce lure and a ⅛ ounce lure.

The different counterbalance floats may be attached and removed by simply slipping the float from the distal guide element 23. The counterbalance float 24 may be adjusted along the distal guide element 23 in a proximal or distal direction to control the amount of weight the guide and lock assembly will support in the unlocked position. If the counterbalance float 24 is moved in a proximal direction from the position illustrated in FIG. 1, the guide and lock assembly will support less weight before tipping to the locked position. Conversely, when the counterbalance float is moved in a distal direction, the guide and lock assembly will support more weight.

It will be appreciated that when a fish is hooked, the pull exerted on the fishing line in opposite directions moves the guide and lock assembly to the unlocked position to allow the fishing line to be freely reeled in.

From the foregoing description, it will be seen that I have provided a novel slip bobber, which is not only of simple and inexpensive construction, but one which functions in a more efficient manner than any heretofore known slip bobbers.

What is claimed is:

1. A slip bobber comprising;
a float assembly including a bouyant float member,
an elongate support element secured to said float member, said support element having a transverse opening therethrough which is disposed substantially horizontally when the float assembly is floating on the surface of water,
a fishing line guide and locking assembly comprising elongate tubular guide means through which a fishing line passes, said guide means having distal and proximal ends and a counterbalance float mounted thereon adjacent the distal end thereof, a mounting member having a longitudinal opening therethrough and having a transverse opening therethrough communicating with said longitudinal opening, said elongate tubular guide means being secured to said mounting member and communicating with said longitudinal opening, said support element extending through the transverse opening in the mounting member to journal the fishing line guide and locking assembly on the float assembly for pivotal movement between an unlocked position wherein said fishing line guide and locking assembly is disposed horizontally on the surface of the water, and a locked position wherein said fishing line guide and locking assembly is disposed in a vertical position in the water, said fishing line guide and locking assembly when in the unlocked position permitting free movement of the line through the guide means and when in the locked position locking the fishing line against movement with respect to the guide means.

2. The slip bobber as defined in claim 1 wherein said tubular guide means includes elongate tubular proximal and distal guide elements.

3. The slip bobber as defined in claim 2 wherein said counterbalance float is formed of buoyant material and is adjustably mounted on said distal guide element.

4. A slip bobber comprising;
a float assembly including a pair of similar elongate spaced apart, substantially parallel buoyant float members each having proximal and distal ends,
a support element extending between and rigidly interconnecting the proximal ends of said float members, said support element having an opening therethrough which is disposed substantially horizontally when the float assembly is floating on the surface of water.
a fishing line guide and locking assembly comprising elongate tubular guide means through which a fishing line passes, said guide means having distal and proximal ends and a counterbalance float mounted thereon adjacent the distal end thereof,
a mounting member having a longitudinal opening therethrough and a transverse opening therethrough intersecting said longitudinal opening, said elongate tubular guide means being secured to said mounting member and communicating with said longitudinal opening, said support element extending through the transverse opening in the mounting member to journal the fishing line guide and locking assembly on the float assembly for pivotal movement between an unlocked position wherein said fishing line guide and locking assembly is disposed substantially horizontally on the surface of the water, and a locked position within said fishing line guide and locking assembly is disposed substantially vertically in the water, said fishing line guide and locking assembly when in the unlocked position permitting free movement of the line through the guide means and when in the locked position locking the fishing line against movement with respect to the guide means.

5. The slip bobber as defined in claim 4 wherein each of said float members has an outwardly extending float element at its distal end.

6. The slip bobber as defined in claim 4 wherein said tubular guide means includes elongate tubular proximal and distal guide elements.

7. The slip bobber as defined in claim 6 wherein an end portion of each guide element projects into the longitudinal opening in said mounting member.

8. The slip bobber as defined in claim 6 wherein said counterbalance float is longitudinally adjustable on said distal guide element.

9. The slip bobber as defined in claim 4 wherein said mounting member has a pair of ears secured thereto and extending outwardly therefrom for engaging the float members when the guide and locking assembly is in the locked position to limit pivotal movement of the guide and locking assembly.

10. The slip bobber as defined in claim 4 wherein said support element is formed of polyvinyl chloride having a hardness of 85 to 95 durometers.

* * * * *